Patented Jan. 17, 1933

1,894,496

UNITED STATES PATENT OFFICE

ARTHUR B. PICKETT, OF HAINES CITY, FLORIDA

FERTILIZER AND METHOD OF MAKING SAME

No Drawing.   Application filed July 13, 1929.   Serial No. 378,177.

This invention relates to a fertilizer and a method of making same.

An object of the invention is the provision of a fertilizer in the form of a chemically-treated humus made from muck-peat which is steam sterilized, the fertilizer not only acting as a storage plant for moisture and soluble plant food, but as an adsorbent for soluble gases while retaining ammonia as a gas on the surface of the humus until it can be used by the plant.

A further object of the invention is the provision of an artificial fertilizer in the form of a humus which contains other elements most adaptable for plant fertilization, the humus acting to store certain chemical compounds while slowly but progressively distributing the compounds to the roots of the plant, the humus further acting as a medium for absorbing, storing, and for distributing moisture to roots of the plants.

This invention will be best understood from a consideration of the following detailed description forming a part of the specification; nevertheless it is to be understood that the invention is not confined to the disclosure, being susceptible of such changes and modifications which shall define no material departure from the salient features of the invention as expressed in the appended claims.

In carrying out my process I select a muck-peat deposit which is of natural formation and cultivate this humus by plowing, disking, and aerating. Lime and manure is spread over the area and frequently cultivated. This product is then composted in piles for storage and bacterial action to break down in some degree the raw product.

When the raw product is ready for the final process it is placed in steam sterilizers and heated to 225° F. over a period of time and then run through screens, reseeded with bacteria and a balanced bacteria food is supplied. After this the product is ready for further treatment with chemical compounds.

A very important service rendered by the presence of this type of humus in the soil is the ability of the soil to retain moisture and in that way hold plant food in solution for growth and maturing of the product. This is particularly important where the soil contains considerable sand and clay. The humus also acts as a culture medium in which the soil bacteria perform their work and as such holds the plant food in soluble form until the plant roots utilize it.

A number of compounds may be employed which will either release ammonia or the compounds will break down to produce ammonia. The following compounds will be utilized for the purpose,—urea, ammonium sulphate, sodium nitrate, dried blood, calcium nitrate, saltpeter.

In the preparation of the fertilizer 1000 pounds of the aerated, lime and manure-treated peat hereafter designated as humus throughout the specification is employed in connection with 1000 pounds of urea in which ammonia yielded by the urea is approximately 55% so that in the final analysis the ammonia would be approximately 27½%.

On the other hand, sodium nitrate containing available nitrogen may be mixed in equal proportions with the peat treated as above described or ammonium sulphate containing approximately 25% ammonia may be mixed with equal proportions of humus and the final product will contain 12½% ammonia. The above ammonia-producing substances may be used separately or in combination. Furthermore, these ammonium compounds may be mixed and placed in stock so that when definite quantities are mixed with the humus any desired percentage of ammonia may be had.

In the manufacture of the fertilizer the ammonia-producing compound is dissolved in boiling water and a proper percentage of the humus processed as above noted is added to the solution. The humus and the chemical compound are thoroughly mixed, digested and dried.

It will be appreciated that when the compounds containing nitrogen are mixed with the peat that the peat has been aerated, cultivated with lime and manure and has been sterilized and reseeded with bacteria.

The activated materials have the property of absorbing and retaining the plant food until the rootlets take up the food by capillary action and this food is by a chemical affiliation taken up by the organic bodies in the plant in the promotion of its growth.

The humus as processed is not only absorbent for holding moisture in soluble plant food elements but acts as an adsorptive for soluble gases and thereby prevents the unnecessary escape of the gases such as ammonia from the fertilizer. The humus retains the ammonia as a gas on its surface until it can be utilized by the plants.

A product thus manufactured holds the ammonia over a period of time while releasing the ammonia as the growth of the plants demand and also retaining a sufficient quantity of moisture which will expedite the distribution of the chemical compounds.

The humus not only retains moisture and the chemical for proper distribution to the roots of plants but supplies food for the plants.

I claim:—

1. The process of preparing a moisture absorbing fertilizer which comprises mixing lime and manure with muck-peat, storing the same to permit bacterial action to break down the raw product, sterilizing the product, reseeding the product after sterilization with a bacteria culture, saturating the product thus formed with a salt solution containing available nitrogen, then removing the moisture.

2. The process of preparing a moisture absorbing fertilizer which comprises mixing lime and a nitrogen-producing humus with muck-peat, cultivating the mass by plowing and aerating, storing the cultivated mass to permit bacterial action to break down the mass, heating the mass with steam at a temperature approximately 227° F., saturating the sterilized mass with a salt solution containing available nitrogen then removing the moisture.

ARTHUR B. PICKETT.